May 2, 1961 G. G. J. GÜNTHER ET AL 2,982,668
METHOD OF PRODUCING OXIDE COATINGS ON SURFACES, ESPECIALLY
A LIGHT-DIFFUSING LAYER ON GLASS VESSELS, E.G. ON
THE INSIDE OF ENVELOPES FOR ELECTRIC LAMPS
Filed March 19, 1957

INVENTORS
GUNNAR G.G. GÜNTHER
COSTA B. ROSENGREN

BY Jarvis C. Marble
ATTORNEY

United States Patent Office 2,982,668
Patented May 2, 1961

2,982,668

METHOD OF PRODUCING OXIDE COATINGS ON SURFACES, ESPECIALLY A LIGHT-DIFFUSING LAYER ON GLASS VESSELS, E.G. ON THE INSIDE OF ENVELOPES FOR ELECTRIC LAMPS

Gunnar G. J. Günther, Stockholm, and Gösta B. Rosengren, Bandhagen, Sweden, assignors to Lumalampan Aktiebolag, Stockholm, Sweden, a corporation of Sweden Filed Mar. 19, 1957, Ser. No. 646,954

Claims priority, application Sweden Jan. 12, 1957

6 Claims. (Cl. 117—33.3)

The present invention concerns a method of producing oxide coatings on surfaces, especially a light-diffusing layer on glass vessels, e.g. on the inside of bulbs for electric lamps. According to the invention, this production is effected by a thermal hydrolysis in a gaseous phase of one or more volatile halogenous compounds, especially chlorides of metals belonging to the fourth group of the periodic system, such as $SiCl_4$, $TiCl_4$, $SnCl_4$, etc., in which process the corresponding oxides, such as $SiO_2$, $TiO_2$, $SnO_2$, etc., respectively, are produced and caused to deposit on the surface in question, forming fine-grained, preferably white layers of great adhesion. In several important respects the layers thus manufactured are superior to the light-diffusing oxide layers previously known, which are usually made by combustion of the said metals or of their volatile organic metallic compounds. At such burning the combustion may happen to prove incomplete, entailing a detrimental effect upon the layer, inasmuch as the latter will contain unburnt, discolouring material. At the combustion of fluids that are volatile and evaporate inside the bulb prior to the combustion moment, there is also a certain risk of the fluid evaporating too intensely, spurting about from out of the combustion device and causing stains in the layer. If heavier coatings are applied so as to produce an opaline light diffusion, the adhesion is often insufficient to endure the subsequent stresses involved in the manufacture of the lamp.

The present invention eliminates these disadvantages entirely, economizes the manufacture, and brings additional advantages to the lamp itself in that a chemical treatment of the surface of the bulb is obtained at the same time.

Figure 1:
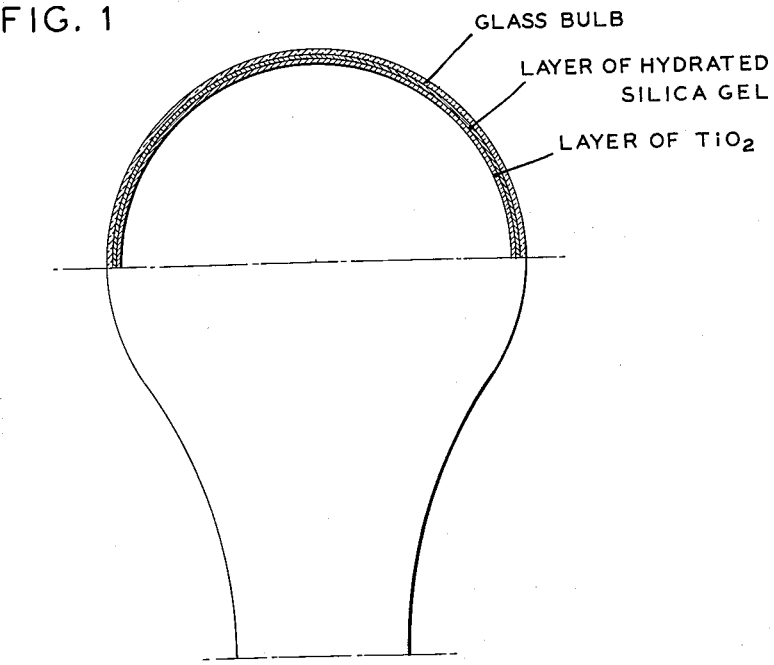
Figure 2:
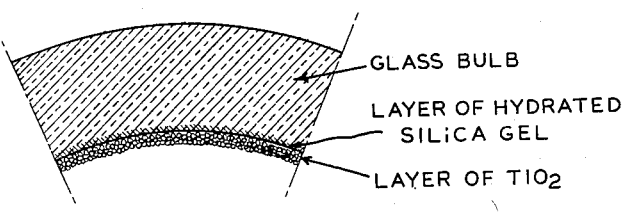

The drawing in Figure 1, shows a light bulb, partly in section, in accordance with the present invention. Figure 2, is a fragmentary detailed section of the bulb envelope of Figure 1.

According to one embodiment of the invention, a hot steam atmosphere is created by burning a combustible gas, preferably pure hydrogen, in pure oxygen, and the gasified chloride or other halogen compound, e.g. $SiCl_4$, injected or in another way introduced into the hydrogen or oxygen stream, is subjected to a quick thermal hydrolysis in the gaseous phase to form a reactive hydrochloric acid gas in status nascendi and a fine-grained, perfectly pure silicon dioxide reek, which deposits on the inside of the warm, rotating lamp bulb or on some other surface intended. By means of the hydrochloric acid atmosphere a considerable increase is obtained in the adhesive property. Further, by the action of the hydrochloric acid, part of the alkaline ions of the glass surface are exchanged for hydrogen ions, while a hydrated silica gel layer released from the glass material is formed on the glass surface, which layer is dehydrated during the heating forming a more or less well developed, thin surface layer, which blocks the continued sodium ion diffusion from the interior of the glass. Such a blockade is desirable, especially when the glass surface has been enlarged by frosting, because alkaline ions diffusing into the surface layer of the inner surface of the lamp bulbs under the action of electric fields in the operation of the lamp, may react disadvantageously to gases or other fluid or solid substances present. The particles of the fine-grained oxide smoke deposit on this surface layer, building up a more or less compact light-diffusing layer of extraordinary uniformity and density.

Though it is, of course, possible to let the thermal hydrolysis take place in a separate chamber, the oxide reek and the hydrochloric acid containing, warm gas stream being conveyed by a tube into the glass bulbs, where the oxide reek deposits on the inner wall, the hydrolysis should preferably take place directly in the space of the glass envelope, since the chemical surface reactions in the interior glass surface of the bulb then become more pronounced and result in an improved adhesion. In the case of a separate hydrolysis chamber being used, it is particularly suitable to utilize electrostatic forces when the oxide reek deposits on the glass surface after being conveyed into the glass envelope.

Any oxyhydrogen gas burner with a suitably shaped flame can be used for the thermal hydrolysis. The flame may preferably be flat and fish-tail-shaped. To great advantage also the burner described in our British Patent No. 704,189 can be used, the combustible gas suitably being led in together with the volatile chloric compound through a central tube in the burner.

Since the ratio of concentration between the various gaseous basic components can be easily adjusted and checked, the method works with great precision and is suitable for automatic operation involving with strictly maintained intervals.

There is shown in the drawing, the glass bulb of an electric light bulb, Figure 1 being partly in section to show the layer of hydrated silica gel at the inner glass surface on which the titanium dioxide layer is deposited. Figure 2 is similar but in fragmentary enlarged detail to show the silica gel layer within the glass layer, and the titanium dioxide layer on the gel layer.

What we claim is:

1. Method of producing light-diffusing oxide coatings on the inside of glass envelopes for electric lamps, the glass being susceptible to action of hydrochloric acid, comprising the steps of burning in an oxygen and hydrogen containing flame, at least one of the volatile halogenous compounds of at least one metal belonging to the fourth group of the periodic system to form discrete oxide particles, water and hydrochloric acid, the acid acting on the glass in the presence of the water to form a hydrated silica gel layer adherent on the glass, and of depositing on the inside of said lamp on the silica layer adjacent to the glass, a layer of the discrete oxide particles formed as reaction products from said combustion process.

2. Method as claimed in claim 1 in which said combustion reaction is performed within said lamp envelope so as to directly coat the same.

3. Method as claimed in claim 1, in which said combustion reaction comprises a first step of thermal hydrolysis of said halogenous compound outside the envelope and a second step of conveyance of said reaction products into the envelope.

4. Method as claimed in claim 1, in which said halogenous compound comprises at least one of the chlorides selected from the group consisting of $SiCl_4$, $TiCl_4$, and $SnCl_4$.

5. An electric lamp having a glass envelope having its inner surface carrying a thin adherent hydrated silica gel layer produced in situ from the glass envelope itself, the adherent silica layer being coated with an adherent layer of discrete fine-grained particles of an oxide of a metal of the fourth group of the periodic system, forming a light diffusing layer.

6. An electric lamp as claimed in claim 5 according to which the oxide of the metal of the fourth group is titanium dioxide.

References Cited in the file of this patent
UNITED STATES PATENTS

| | | |
|---|---|---|
| 2,272,342 | Hyde | Feb. 10, 1942 |
| 2,280,939 | Weinhart | Apr. 28, 1942 |
| 2,545,896 | Pipkin | Mar. 20, 1951 |
| 2,772,654 | Heckart | Dec. 4, 1956 |